United States Patent [19]

Hayashi et al.

[11] Patent Number: 5,410,748

[45] Date of Patent: Apr. 25, 1995

[54] SPACE DIVERSITY RECEIVERS

[75] Inventors: Toshitada Hayashi, Tokyo; Hiroshi Nakayama, Saitama; Yoshihiro Shimada; Tadashi Okamoto, both of Kanagawa, all of Japan

[73] Assignee: Sony Corporation, Tokyo, Japan

[21] Appl. No.: 889,668

[22] Filed: May 28, 1992

[30] Foreign Application Priority Data

Jun. 4, 1991 [JP] Japan .................. 3-132987

[51] Int. Cl.$^6$ .............................................. H04B 1/06
[52] U.S. Cl. .................................. 455/277.1; 455/135; 455/272
[58] Field of Search ................... 455/272, 277.1, 277.2, 455/278, 133, 134, 135, 67.1; 324/133, 522, 539, 543

[56] References Cited

U.S. PATENT DOCUMENTS

| 3,969,672 | 7/1976 | Wallander et al. | 342/133 |
| 4,229,691 | 10/1981 | Loesch | 342/539 |
| 4,506,385 | 3/1985 | Fedde et al. | 455/67.1 |
| 4,814,882 | 3/1989 | Nuimura | 455/277.1 |

FOREIGN PATENT DOCUMENTS

| 168440 | 12/1981 | Japan | 455/277.1 |
| 14224 | 1/1982 | Japan | 455/277.1 |
| 127339 | 8/1982 | Japan | 455/272 |
| 772269 | 3/1989 | Japan | 455/272 |
| 262338 | 10/1991 | Japan . | |

Primary Examiner—Edward F. Urban
Assistant Examiner—Thanh Le
Attorney, Agent, or Firm—Limbach & Limbach; Philip M. Shaw, Jr.

[57] ABSTRACT

A space diversity receiver comprises a plurality of antenna connectors, with each of which an antenna is to be connected, a signal selecting portion for selecting one of signals from the antenna connectors, a signal processing circuit block for producing an output signal based on a signal selected by the signal selecting portion, wherein a signal sampling operation through which the signals obtained from the antenna connectors are sampled for every short period to be supplied to the signal processing circuit block is performed by the signal selecting portion during a specific period so as to select one of the antenna connectors through which a signal giving rise to the best output signal of the signal processing circuit block is introduce and the signal introduced through the selected antenna connector is continuously selected by the signal selecting portion during a period successive to the specific period, the signal selecting portion being controlled to perform the signal sampling operation in such a manner that noise components in the output signal of the signal processing circuit block resulted from the signal sampling operation are effectively reduced.

8 Claims, 10 Drawing Sheets

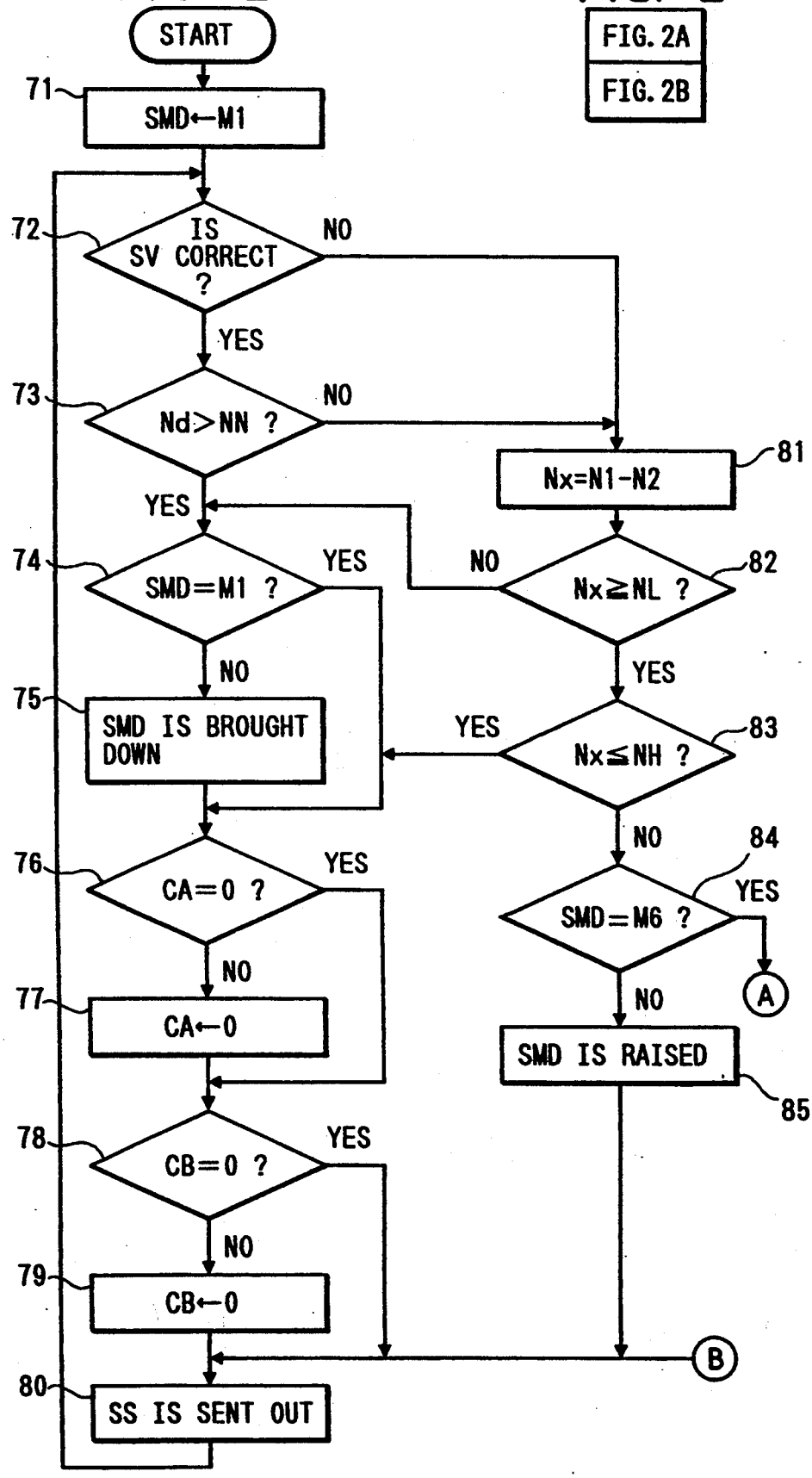

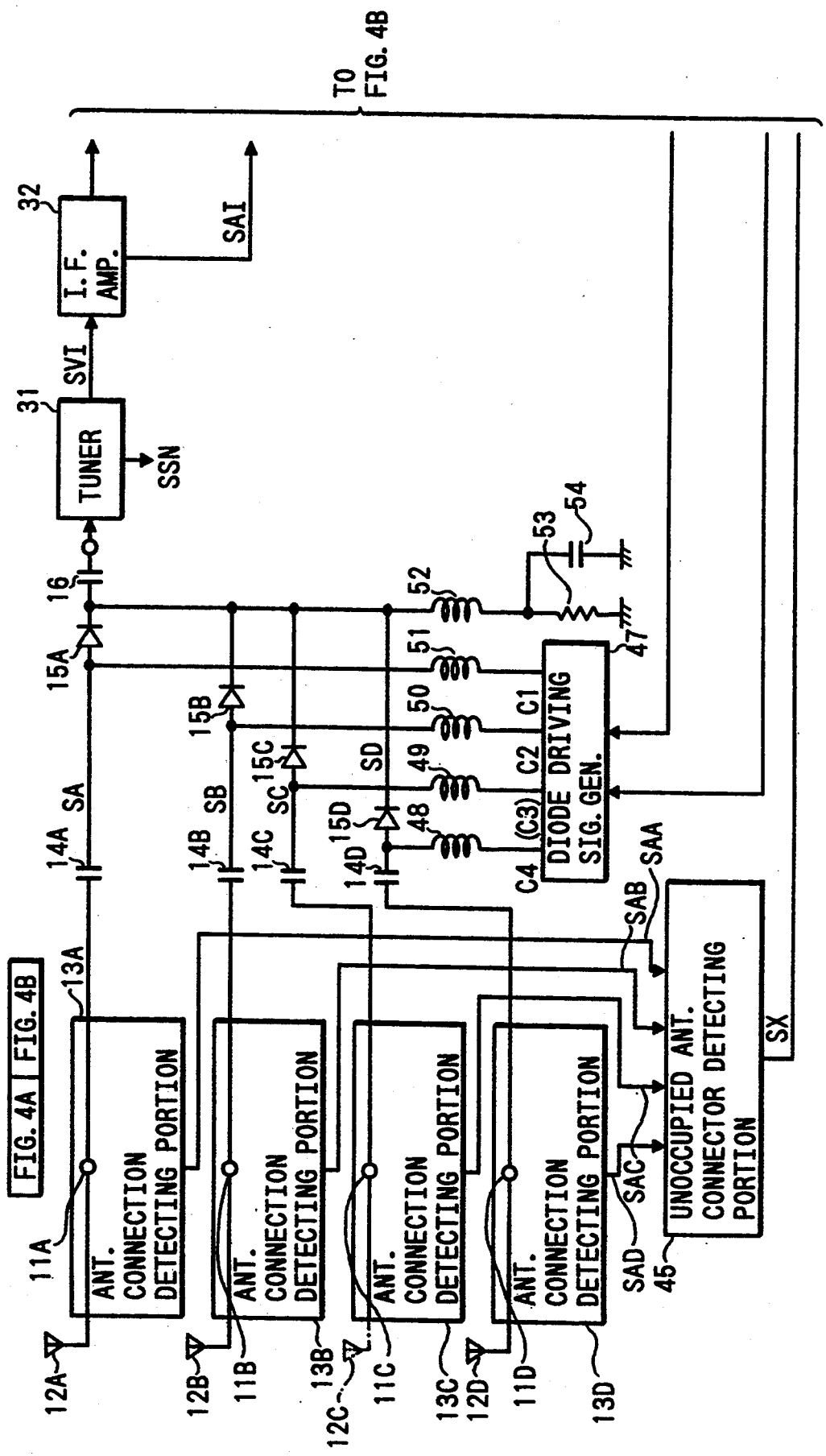

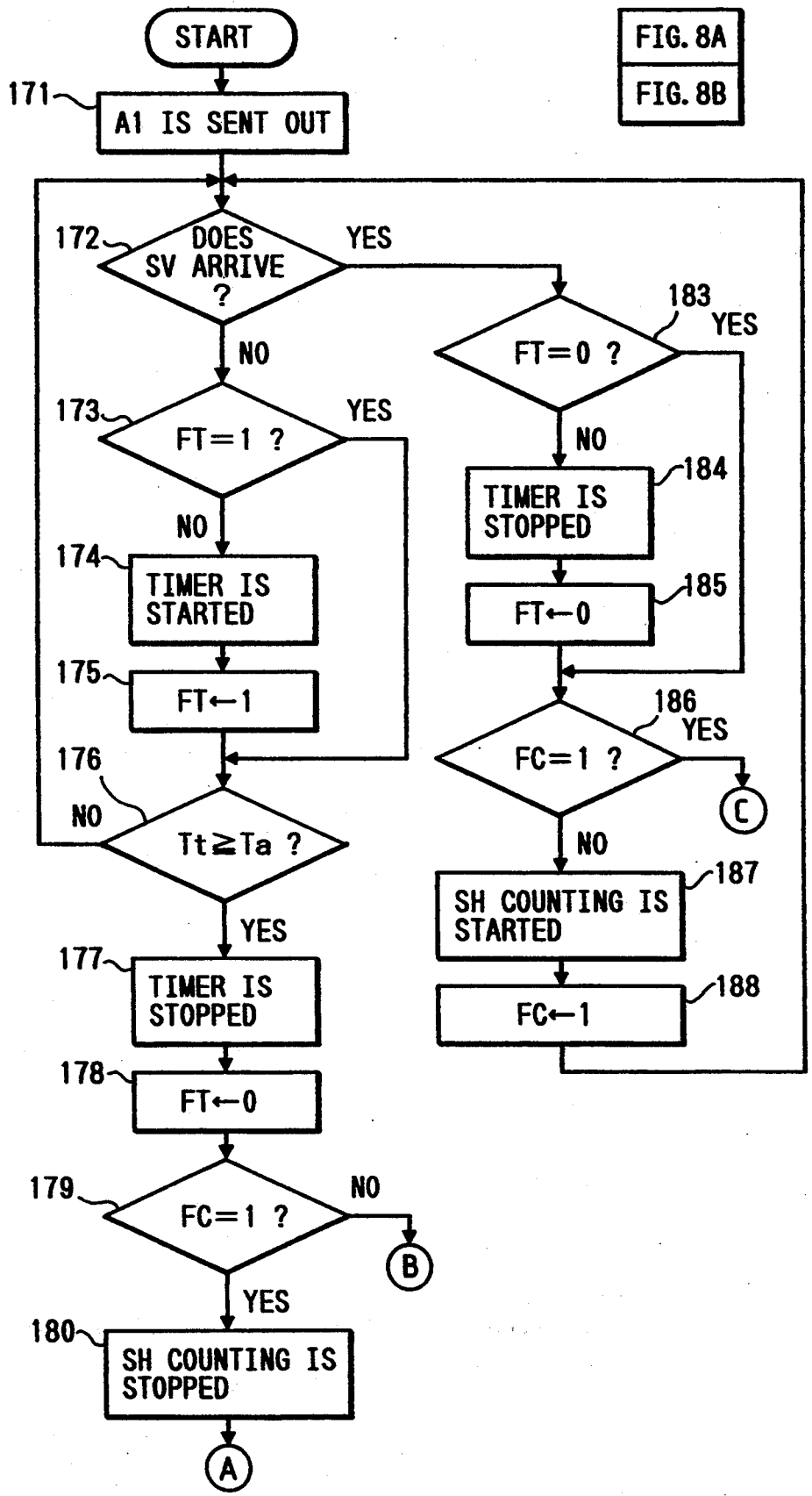

SPACE DIVERSITY RECEIVERS

BACKGROUND OF THE INVENTION

1. Field of the Invention

The present invention relates generally to space diversity receivers, and more particularly, to an improved space diversity receiver which has at least two antennas spaced from each other and is operative to select the best one of signals received respectively by the antennas to obtain reproduced video and/or audio signals therefrom.

2. Description of the Prior Art

In a television broadcast signal receiving system provided in an automobile, it is prevalent to use a space diversity receiver since the location of the receiver changes over a relatively broad area and the intensity of the electric field of a television broadcast signal varies quite frequently. The space diversity receiver used in the automobile is accompanied with, for example, four antenna connectors mounted on middle and rear parts of each of left and right sides of a cabin portion each to be coupled with an antenna.

In such a space diversity receiver, during a specific period corresponding to, for example, a beginning portion of a vertical blanking period of the television broadcast signal to be received, output signals of a signal processing circuit block produced respectively based on signals obtained from the antenna connectors are compared in quality with one another to select one of the antenna connectors through which a signal giving rise to the best output signal of the signal processing circuit block is introduced, and then during a period successive to the specific period, the signal introduced through a selected antenna connector is supplied to the signal processing circuit block. The signal processing circuit block produces a received signal output based on the signal introduced through the selected antenna connector, from which reproduced video and audio signals are produced.

In the space diversity receiver as described above, the signal obtained from the antenna connector constitutes an antenna output signal when an antenna is connected with the antenna connector. However, frequently all four antenna connectors are not each provided with an antenna, for example, only three of them are provided with antennas. In such a case, the signal obtained from the antenna connector which is not connected to an antenna does not constitute the antenna output signal.

In such a case, in determining the signal giving rise to the best output signal of the signal processing signals obtained respectively from the four antenna connectors, the signals are selectively sampled for every predetermined short period and successively supplied to the signal processing circuit block without checking whether the four antenna connectors are all provided with respective antennas or not. In the signal processing circuit block, output signals are produced based on the sampled signals, respectively, and compared with one another so as to determine the best output signal.

Under such a condition, the output signals of the signal processing circuit block and derived to be interconnected with a discontinuous portion between each successive two so as to produce a received signal output. Since the signal sampling operation is performed in, for example, the vertical blanking period of the television broadcast signal to be received, no substantial trouble or problem is brought about on a picture produced in accordance with the reproduced video signal which is obtained based on the received signal output derived from the signal processing circuit block even if the received signal output derived from the processing circuit block contains the discontinuous portions therein. However, in respect of a sound produced in accordance with the reproduced audio signal which is obtained based on the received signal output derived from the signal processing circuit block, there is a disadvantage that harsh noise occurs in response to each discontinuous portion contained in the received signal output derived from the signal processing circuit block.

Accordingly, it is desired that the signal sampling operation for selecting the antenna connector through which the signal giving rise to the best output signal of the signal processing circuit block is performed a minimum number of times in order to suppress the harsh noise contained in the sound produced in accordance with the reproduced audio signal.

Further, in the case where the signals obtained respectively from four antenna connectors, at least one of which is not provided with the antenna, are subjected to the signal sampling operation, the signal processing circuit block cannot produce a correct output signal thereof during a short period in which the signal obtained from the antenna connector with which the antenna is not provided is supplied thereto and therefore the received signal output is intermittently derived form the signal processing circuit block to include lacking portions. A sound produced in accordance with the reproduced audio signal obtained based on such a received signal output as to include the lacking portions contains also harsh noise resulting from the lacking portions of the received signal output.

OBJECTS AND SUMMARY OF THE INVENTION

Accordingly, it is an object of the present invention to provide an improved space diversity receiver for receiving broadcast signals, which avoids the aforementioned disadvantages and problems encountered with the prior art.

Another object of the present invention is to provide an improved space diversity receiver for receiving broadcast signals, in which a plurality of antenna connectors are provided so that a signal sampling operation wherein signals obtained respectively from the antenna connectors are selectively sampled to be successively supplied to a signal processing circuit block is performed and output signals of the signal processing circuit block produced respectively based on the sampled signals are compared in quality with one another to select one of the antenna connectors through which a signal giving rise to the best output signal of the signal processing circuit block is introduced during a specific period, and then during a period successive to the specific period, the signal introduced through a selected antenna connector is supplied continuously to the signal processing circuit block to produce a received signal output, and which can effectively reduce harsh noise occurring in a sound reproduced based on the received signal output derived from the signal processing circuit block as a result of the signal sampling operation when one of the antenna connectors is not connected to an antenna.

A further object of the present invention is to provide an improved space diversity receiver for receiving broadcast signals, in which a plurality of antenna connectors are provided so that a signal sampling operation wherein signals obtained respectively from the antenna connectors are selectively sampled to be successively supplied to a signal processing circuit block is performed and output signals of the signal processing circuit block produced respectively based on the sampled signals are compared in quality with one another to select one of the antenna connectors through which a signal giving rise to the best output signal of the signal processing circuit block is introduced during a specific period, and then during a period successive to the specific period, the signal introduced through a selected antenna connector is supplied continuously to the signal processing circuit block to produce a received signal output, and which can effectively reduce harsh noise occurring in a sound reproduced based on the received signal output derived from the signal processing circuit block in response to discontinuous portions of the received signal output resulting from the signal sampling operation.

A still further object of the present invention is to provide an improved space diversity receiver for receiving broadcast signals, in which a plurality of antenna connectors are provided so that a signal sampling operation wherein signals obtained respectively from the antenna connectors are selectively sampled to be successively supplied to a signal processing circuit block is performed and output signals of the signal processing circuit block produced respectively based on the sampled signals are compared in quality with one another to select one of the antenna connectors through which a signal giving rise to the best output signal of the signal processing circuit block is introduced during a specific period, and then during a period successive to the specific period, the signal introduced through a selected antenna connector is supplied continuously to the signal processing circuit block to produce a received signal output, and which can effectively reduce harsh noise occurring in a sound reproduced based on the received signal output derived from the signal processing circuit block in response to lacking portions of the received signal output resulting from the signal sampling operation.

According to one of aspects of the present invention, there is provided a space diversity receiver comprising a plurality of antenna connectors, with each of which an antenna is to be connected, a signal selecting portion for selecting one of signals obtained respectively from the antenna connectors, a signal processing circuit block operative to produce an output signal based on a signal selected by the signal selector, a signal sampling control portion operative to cause the signal selecting portion to perform a signal sampling operation through which the signals obtained respectively from the antenna connectors are selectively sampled for every predetermined short period to be supplied to the signal processing circuit block during a specific period, an antenna connector selecting portion operative to compare in quality the output signals of the signal processing circuit block obtained successively based on signals sampled through the signal sampling operation performed by the signal selecting portion with one another in order to select one of the antenna connectors through which a signal giving rise to the best output signal of the signal processing circuit block is introduced during the specific period, and a signal selecting control portion operative to cause the signal selecting portion to select the signal introduced through the antenna connector selected by the antenna connector selecting portion during a period successive to the specific period, wherein the signal sampling control portion is further operative to elongate the interval between the specific periods so that the frequency of signal sampling operations in the signal selecting portion is reduced in response to increase in stability of the signal selected to be supplied to the signal processing circuit block during the period successive to the specific period and to stop the signal sampling operation when the signal selected to be supplied to the signal processing circuit block during the period successive to the specific period is sufficiently stabilized.

With the space diversity receiver thus constituted in accordance with one aspect of the present invention, under a condition in which the signal sampling operation is performed by the signal selecting portion and the output signals of the signal processing circuit block obtained based on the signals sampled successively through the signal sampling operation are compared with one another by the antenna connector selecting portion in order to select the antenna connector through which the signal giving rise to the best output signal of the signal processing circuit block is introduced during the specific period, the frequency of signal sampling operations in the signal selecting portion is reduced in response to increase in stability of the signal selected to be supplied to the signal processing circuit block during the period successive to the specific period and then the signal sampling operation is stopped when the signal selected to be supplied to the signal processing circuit block during the period successive to the specific period is sufficiently stabilized. Accordingly, the signal sampling operation is performed minimum times under the necessity, so that harsh noise occurring in a sound reproduced based on a received signal output derived from the signal processing circuit block in response to discontinuous portions of the received signal output resulting from the signal sampling operation is effectively reduced.

The above and other objects, features and advantages of the present invention will become apparent from the following detailed description taken in conjunction with the accompanying drawings.

BRIEF DESCRIPTION OF THE DRAWINGS

FIGS. 2A, 2B and 3 are flow charts used for explaining the operation of the embodiment shown in FIG. 1;

FIGS. 4A and 4B are a schematic circuit diagram containing block expression and showing a second embodiment of space diversity receiver according to the present invention;

FIGS. 8A and 8B are a flow chart used for explaining the operation of the embodiment shown in FIG. 7.

DESCRIPTION OF THE PREFERRED EMBODIMENTS

Figure 1:
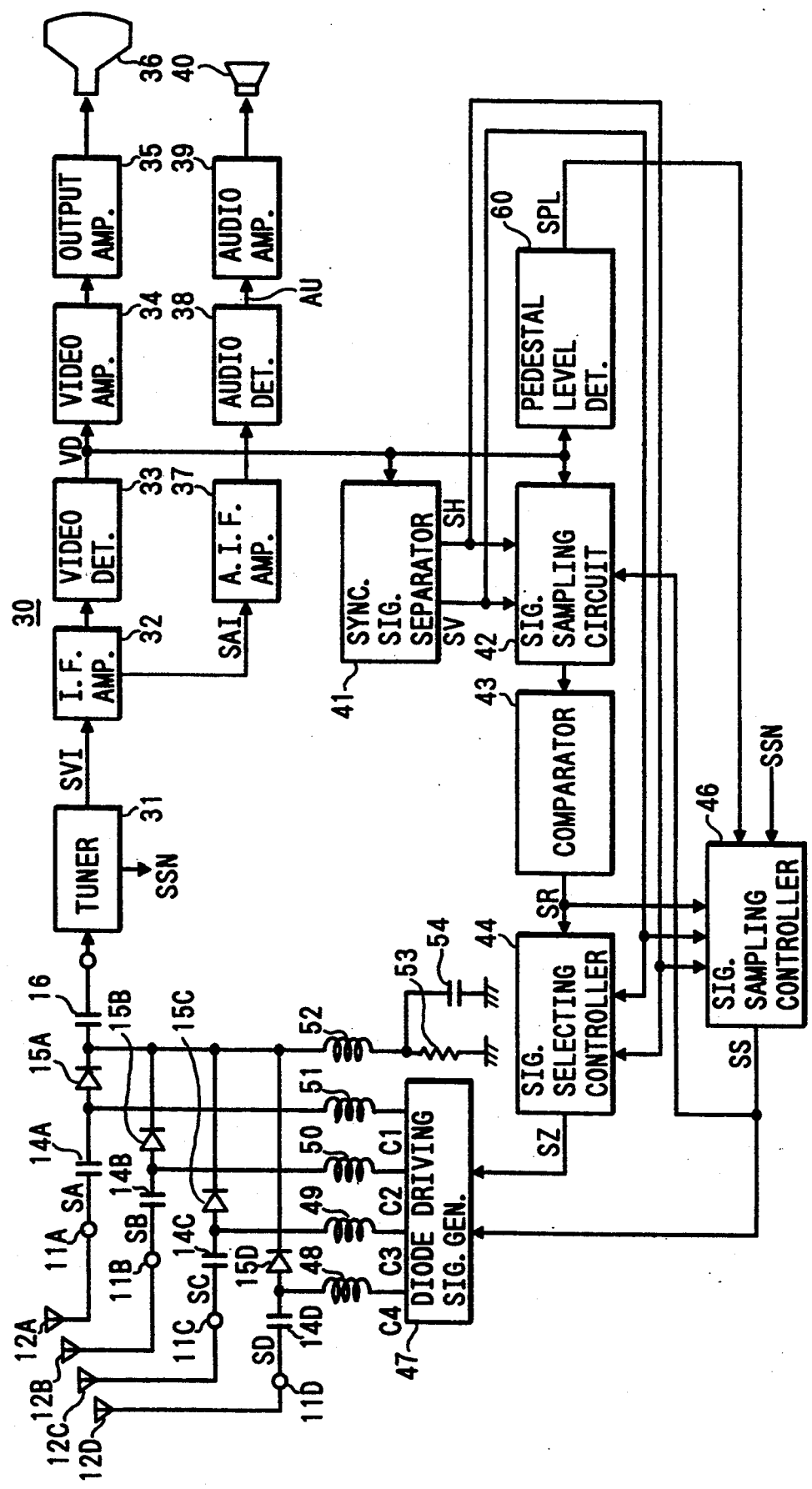
FIG. 1 is a schematic circuit diagram containing block expression and showing a first embodiment of space diversity receiver according to the present invention.

FIG. 1 shows a first embodiment of space diversity receiver according to the present invention. The embodiment shown in FIG. 1 constitutes a space diversity receiver for use in an automobile to receive a television broadcast signal.

The space diversity receiver of FIG. 1 includes four antenna connectors 11A, 11B, 11C and 11D mounted respectively on middle and rear portions of each of left and right outer sides of a cabin of an automobile, and antennas 12A, 12B, 12C and 12D are connected with the antenna connectors 11A to 11D, respectively. Antenna connector signals SA, SB, SC and SD which are obtained through the antenna connectors 11A to 11D, respectively, when the television broadcast signal is received by each of the antennas 12A to 12D, are supplied through a capacitor 14A to a switching diode 15A, through a capacitor 14B to a switching diode 15B, through a capacitor 14C to a switching diode 15C and through a capacitor 14D to a switching diode 15D, respectively. The switching diodes 15A to 15D are controlled as explained later in such a manner that only one of the switching diodes 15A to 15D is put in the ON state to allow a signal to pass therethrough and therefore one of the antenna connector signals SA, SB, SC and SD is supplied through one of the switching diodes 15A to 15D and a capacitor 16 to a tuner 31 which constitutes a part of signal processing circuit block 30.

In the tuner 31, the antenna connector signal SA, SB, SC or SD is amplified and subjected to frequency conversion. Then, a video intermediate frequency signal SVI is obtained based on the antenna connector signal SA, SB, SC or SD from the tuner 31 and supplied to an intermediate frequency amplifier 32. The video intermediate frequency signal SVI amplified by the intermediate frequency amplifier 32 is then supplied to a video detector 33. In the video detector 33, the video intermediate frequency signal SVI is demodulated to produce a video signal VD. The video signal VD derived from the video detector 33 is amplified by a video amplifier 34 and then further amplified by an output amplifier 35 to be supplied to a cathode ray tube 36, so that a reproduced picture is obtained based on the video signal VD on a display screen of the cathode ray tube 36.

An audio intermediate frequency signal SAI separated from the video intermediate frequency signal SVI is also obtained from the intermediate frequency amplifier 32 to be supplied to an audio intermediate frequency amplifier 37. The audio intermediate frequency signal SAI amplified by the audio intermediate frequency amplifier 37 is supplied to an audio detector 38. In the audio detector 38, the audio intermediate frequency signal SAI is demodulated to produce an audio signal AU. The audio signal AU derived from the audio detector 38 is amplified by an audio amplifier 39 to be supplied to a speaker 40, so that a reproduced sound is obtained based on the audio signal AU from the speaker 40.

In the tuner 31, a signal to noise ratio (S/N ratio) of the antenna connector signal SA, SB, SC or SD is detected and a detection output signal SSN produced thereby is sent out of the tuner 31.

The video signal VD derived from the video detector 33 is also supplied to each of a synchronous signal separator 41, a signal sampling circuit 42 and a pedestal level detector 60. In the synchronous signal separator 41, a vertical synchronous signal SV and a horizontal synchronous signal SH are separated from the video signal VD, and in the pedestal level detector 60, a pedestal level of the video signal VD is detected to produce a detection output signal SPL which varies in response to variations in the pedestal level of the video signal VD.

The detection output signal SSN derived from the tuner 31, the vertical and horizontal synchronous signals SV and SH obtained from the synchronous signal separator 41, and the detection output signal SPL obtained from the pedestal level detector 60 are supplied to a signal sampling controller 46. The signal sampling controller 46 is operative to detect a predetermined specific period in a vertical blanking period of the video signal VD, such a period as corresponding to an equalizing pulse period successive to the vertical synchronous signal SV, on the strength of the vertical and horizontal synchronous signals SV and SH and to supply a diode driving signal generator 47 with a control signal SS during the specific period detected in every vertical blanking period of the video signal VD or during the specific period detected in every predetermined number of vertical blanking periods of the video signal VD.

The diode driving signal generator 47 includes four output terminals connected through choke coils 48, 49, 50 and 51 with anodes of the switching diodes 15A to 15D, respectively. Cathodes of the switching diode 15A to 15D are connected in common and grounded through a choke coil 52 and a parallel connection of a resistor 53 and a capacitor 54. The diode driving signal generator 47 is operative to supply through the output terminals thereof respectively the anodes of the switching diodes 15A to 15D with driving signal C1, C2, C3 and C4 successively for every predetermined short period, such as every period of several microseconds, in response to the control signal SS supplied from the signal sampling controller 46 during the specific period. The switching diodes 15A to 15D are put in the ON state respectively by the driving signals C1 to C4 supplied to the cathodes of the switching diodes 15A to 15D.

With such an operation of the diode driving signal generator 47, during the specific period detected by the signal sampling controller 46, the switching diodes 15A to 15D are successively put in the ON state for every predetermined short period so that a signal sampling operation by which the antenna connector signals SA, SB, SC and SD are successively sampled for every predetermined short period to be supplied to the tuner 31 is carried out. Accordingly, the switching diodes 15A to 15D and the diode driving signal generator 47 constitute an antenna connector signal selecting portion, and during the specific period, such as the period corresponding to the equalizing pulse period next to the vertical synchronous signal, in every vertical blanking period or every predetermined number of vertical blanking periods of the video signal VD, the video signal VD based on the antenna connector signal SA, video signal VD based on the antenna connector signal SB, video signal VD based on the antenna connector signal SC and video signal VD based on the antenna connector signal SD are successively obtained for every predetermined short period from the video detector 33.

The video signals VD thus obtained based on the antenna connector signals SA, SB, SC and SD, respectively, are supplied to the signal sampling circuit 42 to which the vertical and horizontal synchronous signals SV and SH derived from the synchronous signal separator 41 and the control signal SS derived from the signal sampling controller 46 are also supplied. The signal sampling circuit 42 is operative to pick out successively each of the video signals VD obtained based on the antenna connector signals SA, SB, SC and SD, respectively, to be supplied a comparator 43 in synchronism with the control signal SS derived from the signal sampling controller 46.

The comparator 43 is operative to hold each of the video signals VD obtained based on the antenna connector signals SA, SB, SC and SD, respectively, and selected successively by the signal sampling circuit 42 and to compare in quality the video signals VD obtained based on the antenna connector signals SA, SB, SC and SD with one another so as to select the best one of the video signals VD obtained based on the antenna connector signals SA, SB, SC and SD, respectively. A comparison output signal SR representing the best video signal VD selected by the comparator 43 is obtained from the comparator 43 to be supplied to a signal selecting controller 44. The signal sampling circuit 42 and the comparator 43 constitute a signal selector for selecting one of the antenna connector signals SA, SB, SC and SD which gives rise to the best one of the video signals VD obtained based on the antenna connector signals SA, SB, SC and SD, respectively, during the specific period detected by the signal sampling controller 46.

The signal selecting controller 44, to which the vertical and horizontal synchronous signals SV and SH derived from the synchronous signal separator 41 are supplied, is operative to supply the diode driving signal generator 47 with a control signal SZ which has different aspects respectively in the case where the comparison output signal SR represents the video signal VD obtained based on the antenna connector signal SA, in the case where the comparison output signal SR represents the video signal VD obtained based on the antenna connector signal SB, in the case where the comparison output signal SR represents the video signal VD obtained based on the antenna connector signal SC, and in the case where the comparison output signal SR represents the video signal VD obtained based on the antenna connector signal SD, during a period successive to the specific period in the vertical blanking period of the video signal VD.

The diode driving signal generator 47 does not supply each of the switching diodes 15B to 15D with any driving signal but supplies the switching diode 15A with the driving signal C1 so as to cause only the switching diode 15A to be in the ON state when the control signal SZ from the signal selecting controller 44 corresponds to the comparison output signal SR representing the video signal VD obtained based on the antenna connector signal SA; does not supply each of the switching diodes 15A, 15C and 15D with any driving signal but supplies the switching diode 15B with the driving signal C2 so as to cause only the switching diode 15B to be in the ON state when the control signal SZ from the signal selecting controller 44 corresponds to the comparison output signal SR representing the video signal VD obtained based on the antenna connector signal SB; does not supply each of the switching diodes 15A, 15B and 15D with any driving signal but supplies the switching diode 15C with the driving signal C3 so as to cause only the switching diode 15C to be in the ON state when the control signal SZ from the signal selecting controller 44 corresponds to the comparison output signal SR representing the video signal VD obtained based on the antenna connector signal SC; and does not supply each of the switching diodes 15A to 15C with any driving signal but supplies the switching diode 15D with the driving signal C4 so as to cause only the switching diode 15D to be in the ON state when the control signal SZ from the signal selecting controller 44 corresponds to the comparison output signal SR representing the video signal VD obtained based on the antenna connector signal SD, in the period successive to the specific period in the vertical blanking period of the video signal VD. The change in one of the driving signals C1 to C4 sent out of the diode driving signal generator 47 is carried out at a time point corresponding to the beginning end of the vertical blanking period of the video signal VD.

Accordingly, during the period successive to the specific period in the vertical blanking period of the video signal VD, one of the switching diodes 15A to 15D is caused to be in the ON state in such a manner as mentioned above so that one of the antenna connector signals SA, SB, SC and SD is supplied to the tuner 31 and thereby the best one of the video signals VD obtained based on the antenna connector signals SA, SB, SC and SD, respectively, is derived from the video detector.

Under such a condition, the comparison output signal SR is also supplied to the signal sampling controller 46. The signal sampling controller 46 determines the frequency of supplies of the control signal SS based on the comparison output signal SR, the detection output signal SSN, the detection output signal SPL and the vertical synchronous signal SV. The frequency of supplies of the control signal SS in the signal sampling controller 46 fixes the frequency of signal sampling operations in the antenna output signal selecting portion comprising the switching diodes 15A to 15D and the diode driving signal generator 47.

The frequency of signal sampling operations in the antenna output signal selecting portion is classified into, for example, six sampling modes M1, M2, M3, M4, M5 and M6 in accordance with the condition of one of the antenna connector signals SA, SB, SC and SD selected to give rise to the best video signal VD, which can be detected on the strength of the comparison output signal SR derived from the comparator 43 and the details of each of the sampling modes M1 to M6 are shown in Table - I mentioned below.

TABLE I

| SMD | Freq. of Sampl. | Upper Limit of Nx | Lower Limit of Nx |
|---|---|---|---|
| M1 | every V-Period | 45 times | — |
| M2 | every 2 V-Periods | 22 times | 8 times |
| M3 | every 5 V-Periods | 9 times | 4 times |
| M4 | every 7 V-Periods | 6 times | 3 times |
| M5 | every 16 V-Periods | twice | twice |
| M6 | No Sampling | — | — |

In Table - I, SMD represents a sampling mode, Freq. of Sampl. represents the frequency of signal sampling operations, V-Period represents a vertical period or field period of the video signal VD, and Nx represents a difference between the number of selection times per unit period of one of the antenna connector signals SA, SB, SC and SD which is selected the most frequently to give rise to the best video signal VD and the number of selection times per unit period of another of the antenna connector signals SA, SB, SC and SD is selected the second most frequently to give rise to the best video signal VD.

As understood from Table - I, the frequency of signal sampling operations in the antenna output signal selecting portion changes from the sampling mode M1 toward the sampling mode M6 to be reduced in response to a reduction in the value of Nx. Since the value of Nx reduces in response to increase in stability of the antenna connector signal SA, SB, SC or SD which is selected by the antenna connector signal selecting portion so as to be supplied to the signal processing circuit block 30 during the period successive to the specific period in the vertical blanking period of the video signal VD, the frequency of signal sampling operations in the antenna connector signal selecting portion is reduced in response to an increase in the stability of the antenna connector signal SA, SB, SC or SD which is selected by the antenna connector signal selecting portion so as to be supplied to the signal processing circuit block 30 during the period successive to the specific period in the vertical blanking period of the video signal VD. Then, when the antenna connector signal SA, SB, SC or SD which is selected to be supplied to the signal processing circuit block 30 during the period successive to the specific period in the vertical blanking period of the video signal VD is sufficiently stabilized, the sampling mode M6 is set up so that the signal sampling operation in the antenna connector signal selecting portion is stopped.

Under the sampling mode M6, the signal sampling controller 46 detects the S/N ratio of the antenna connector signal SA, SB, SC or SD which is selected to be supplied to the tuner 31 during the period successive to the specific period in the vertical blanking period of the video signal VD at predetermined intervals based on the detection output signal SSN derived from the tuner 31 and supplied to the diode driving signal generator 47 with the control signal SS in such a manner as to change the sampling mode M6 into the sampling mode M5 when a reduced S/N ratio is detected continuously for a predetermined number of times, for example, twenty times. Further, the signal sampling controller 46 detects the pedestal level of the video signal VD obtained from the video detector 33 at predetermined intervals based on the detection output signal SPL derived from the pedestal level detector 60 and supplied the diode driving signal generator 47 with the control signal SS in such a manner as to change the sampling mode M6 into the sampling mode M5 when a pedestal level lower than a relatively low reference level is detected continuously for a predetermined number of times, for example, twenty times. Accordingly, under the sampling mode M6 wherein the signal sampling operation in the antenna connector signal selecting portion is stopped, the sampling mode M6 is changed into the sampling mode M5 so that the signal sampling operation in the antenna connector signal sampling portion is resumed when the S/N ratio of the antenna connector signal SA, SB, SC or SD selected to be supplied to the tuner 31 during the period successive to the specific period in the vertical blanking period of the video signal VD has deteriorated or the pedestal level of the video signal VD obtained from the video detector 33 has lowered beyond the reference level.

Further, the signal sampling controller 46 supplies the diode driving signal generator 47 with the control signal SS in such a manner as to bring down the sampling mode by one rank, such as to the sampling mode M4 from the sampling mode M5 or to the sampling mode M3 from the sampling mode M4, so as to increase the frequency of signal sampling operations in the antenna connector signal selecting portion, when it is confirmed that the vertical synchronous signal SV is in such a condition as to fail to be derived from the synchronous signal separator 41 repeatedly over a predetermined number of times.

Since the frequency of signal sampling operations in the antenna connector signal selecting portion which comprises the switching diodes 15A to 15D and the diode driving signal generator 47 is controlled as described above, the signal sampling operation is performed a minimum number of times in order to repress the harsh noise resulting from the signal sampling operation and contained in the reproduced sound which is obtained from the speaker 40 in accordance with the audio signal AU.

Figure 2B:
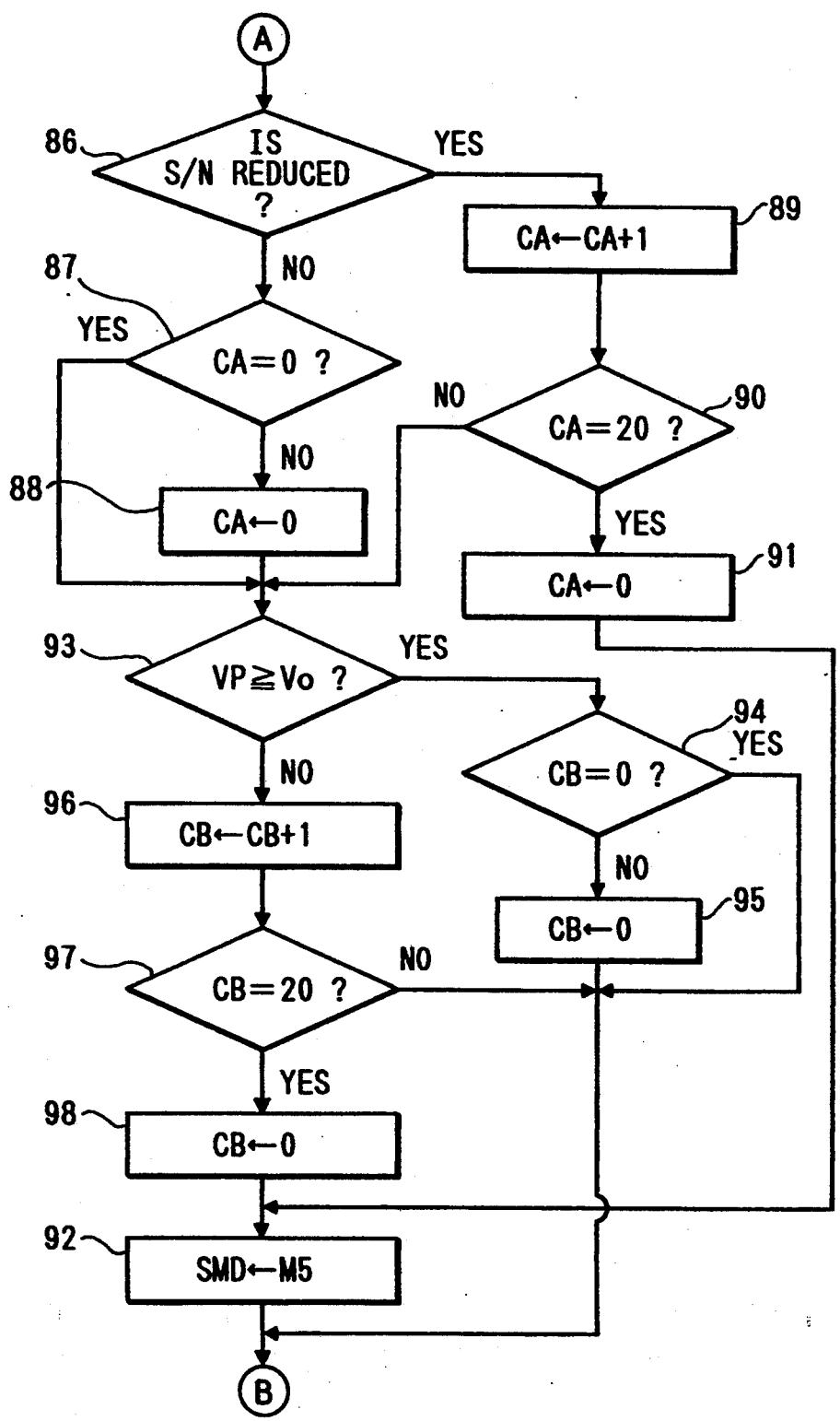
Figure 3:
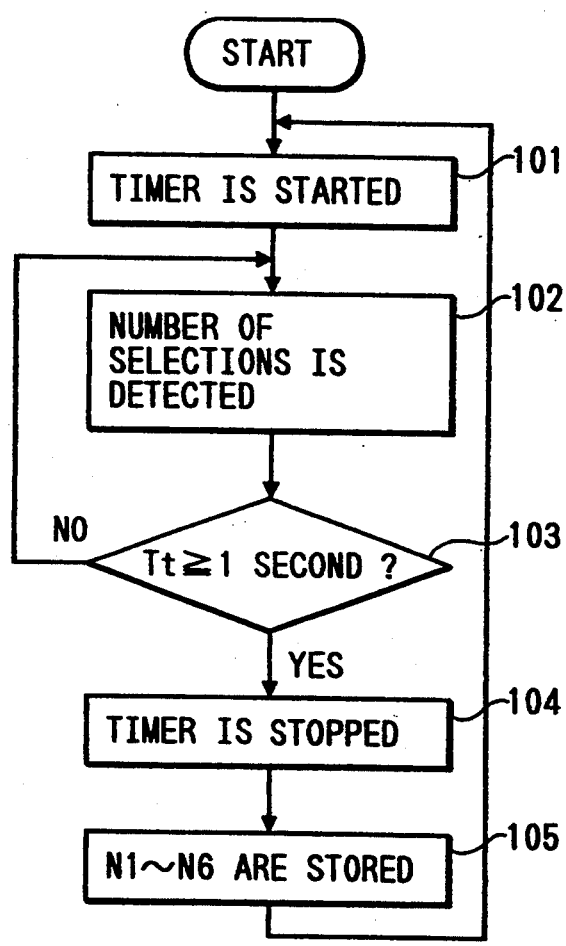

The signal sampling controller 46 employed in the embodiment shown in FIG. 1 to operate as aforementioned is composed of, for example, a microcomputor and examples of control programs carried out by such a microcomputor for controlling the signal sampling operation in the antenna connector signal selecting portion are shown by flow charts of FIGS. 2 and 3.

Referring to the flow chart shown in FIGS. 2A and 2B, in step 71, the sampling mode (SMD) M1 as shown in Table - I is set up. Then, in step 72, it is checked whether the vertical synchronous signal SV fails to be supplied to the signal sampling controller 46 from the synchronous signal separator 41 or not. When the vertical synchronous signal SV fails to be supplied to the signal sampling controller 46, it is further checked whether a number Nd of failing times of the vertical synchronous signal SV is more than a maximum permissible number NN or not, in step 73. If the number Nd of failing tomes is larger than the maximum permissible number NN, it is checked whether the sampling mode M1 has been set or not, in step 74. Then, when the sampling mode M1 has not been set, the sampling mode set on that occasion is brought down by one rank, in step 75, and the process advances to step 76. To the contrary, when the sampling mode M1 has been set, the process advances to the step 76 directly from the step 74.

In the step 76, it is checked whether counted value CA is zero or not. If the counted value CA is not zero, the counted value CA is set to be zero in step 77, and the process advances to step 78. If the counted value CA is zero, the process advances to the process 78 directly from the step 76. In the step 78, it is checked whether counted value CB is zero or not. If the counted value CB is not zero, the counted value CB is set to be zero in step 79 and the process advances to step 80. If the counted value CB is zero, the process advances to the step 80 directly from the step 78.

In the step 80, the control signal SS corresponding to the sampling mode set on that occasion is supplied to the diode driving signal generator 47, and then the process returns to the step 72.

When it is clarified in the step 72 that the vertical synchronous signal SV is correctly supplied to the signal sampling controller 46 from the synchronous signal separator 41 or it is clarified in the step 73 that the number Nd of failing times of the vertical synchronous signal SV is equal to or less than the predetermined maximum permissible number NN, the difference Nx between the number of selection times N1 of one of the antenna connector signals SA, SB, SC and SD which is selected the most frequently to give ride to the best video signal VD and the number of selection times N2 of another of the antenna connector signals SA, SB, SC and SD is selected the second most frequently to give rise to the best video signal VD is calculated, in step 81. The number of selection times N1 and the number of selection times N2 are obtained from a table of antenna connector signal selecting data which is prepared to be renewed base on the comparison output signal SR derived from the comparator 43 through another control program explained later. Then in step 82, it is checked whether the value of the difference Nx is larger than or equal to a value NL of the lower limit of the difference Nx which corresponds to the sampling mode set on that occasion or not. If the value of the difference Nx is smaller than the value NL of the lower limit of the difference Nx, the process advances to the step 74.

If the value of the difference Nx is larger than or equal to the value NL of the lower limit of the difference Nx, it is checked whether the value of the difference Nx is smaller than or equal to a value NH of the upper limit of the difference Nx which corresponds to the sampling mode set on that occasion or not, in step 83. If the value of the difference Nx is smaller than or equal to the value NH of the upper limit of the difference Nx, the process advances to the step 76.

If the value of the difference Nx is larger than the value NH of the upper limit of the difference Nx, it is checked whether the sampling mode M6 has been set or not, in step 84. When the sampling mode M6 has not been set, the sampling mode set on that occasion is raised by one rank, in step 85, and the process advances to the step 80. In the step 80, the control signal SS corresponding to the sampling mode set on that occasion is supplied to the diode driving signal generator 47, and the process returns to the step 72.

When it is clarified in the step 84 that the sampling mode M6 has been set, it is checked based on the detection output signal SSN derived from the tuner 31 whether the S/N ratio of the antenna connector signal SA, SB, SC or SD selected to be supplied to the tuner 31 during the period successive to the specific period in the vertical blanking period of the video signal VD is reduced or not, in step 86. If the S/N ratio of the antenna connector signal SA, SB, SC or SD selected to be supplied to the tuner 31 is not reduced, it is checked whether the counted value CA is zero or not, in step 87. If the counted value CA is not zero, the counted value CA is set to be zero in step 88 and the process advances to step 93. If the counted value CA is zero, the process advances to step 93 directly from the step 87.

When it is clarified in the step 86 that the S/N ratio of the antenna connector signal SA, SB, SC or SD selected to be supplied to the tuner 31 is reduced, the counted value CA is increased by "1" in step 89 and then it is checked whether the counted value CA is larger than or equal to the predetermined reference value set to be, for example, "20", in step 90. If the counted value CA is larger than or equal to the predetermined reference value, the counted value CA is reset to be zero in step 91 and the process advances to step 92. In the step 92, the sampling mode M6 is changed into the sampling mode M5, and then the process advances to the step 80. In the step 80, the control signal SS corresponding to the sampling mode M5 is supplied to the diode driving signal generator 47, and the process returns to the step 72.

When it is clarified in the step 90 that the counted value CA is smaller than the predetermined reference value, the process advances to step 93. In the step 93, it is checked based on the detection output signal SPL derived from the pedestal level detector 60 whether the pedestal level VP of the video signal VD obtained from the video detector 33 is higher than or equal to a predetermined reference level Vo set to be relatively low or not. If the pedestal level VP is higher than or equal to the predetermined reference level Vo, it is checked whether the counted value CB is zero or not, in step 94. If the counted value CB is not zero, the counted value CB is set to be zero in step 95 and the process advances to step 80. If the counted value CB is zero, the process advances to the step 80 directly from the step 94.

When it is clarified in the step 93 that the pedestal level VP is lower than the predetermined reference level Vo, the counted value CB is increased by "1" in step 96 and then it is checked whether the counted value CB is larger than or equal to the predetermined reference value set to be, for example, "20", in step 97. If the counted value CB is larger than or equal to the predetermined reference value, the counted value CB is reset to be zero in step 98 and the process advances to the step 92. In the step 92, the sampling mode M6 is changed into the sampling mode M5, and then the process advances to the step 80. In the step 80, the control signal SS corresponding to the sampling mode M5 is supplied to the diode driving signal generator 47, and the process returns to the step 72.

Further, when it is clarified in the step 97 that the counted value CB is smaller than the predetermined reference value, the process advances to step 80. In the step 80, the control signal SS corresponding to the sampling mode set on that occasion is supplied to the diode driving signal generator 47, and the process returns to the step 72.

Now, referring to the flow chart of FIG. 3 which shows the control program carried out for preparing the table of antenna connector signal selecting data, in step 101, a timer is caused to start operating. Next, in step 102, the number of selection times of each of the antenna connector signals SA, SB, SC and SD selected to give rise to the best video signal VD is memorized temporarily in response to the comparison output signal SR derived from the comparator 43.

Then, in step 103, it is checked whether a time Tt measured by a timer is more than or equal to 1 second or not. If the time Tt is less than 1 second, the step 102 and the step 103 are repeated. When it is clarified in the step 103 that the time Tt is larger than or equal to 1 second, the timer is stopped operating and the time measured by the timer is reset to be zero, in step 104. Then, in step 105, the number of selection times of each of the antenna connector signals SA, SB, SC and SD memorized in the step 102 is renewedly stored in a memory, and then the process returns to the step 101.

Figure 4B:
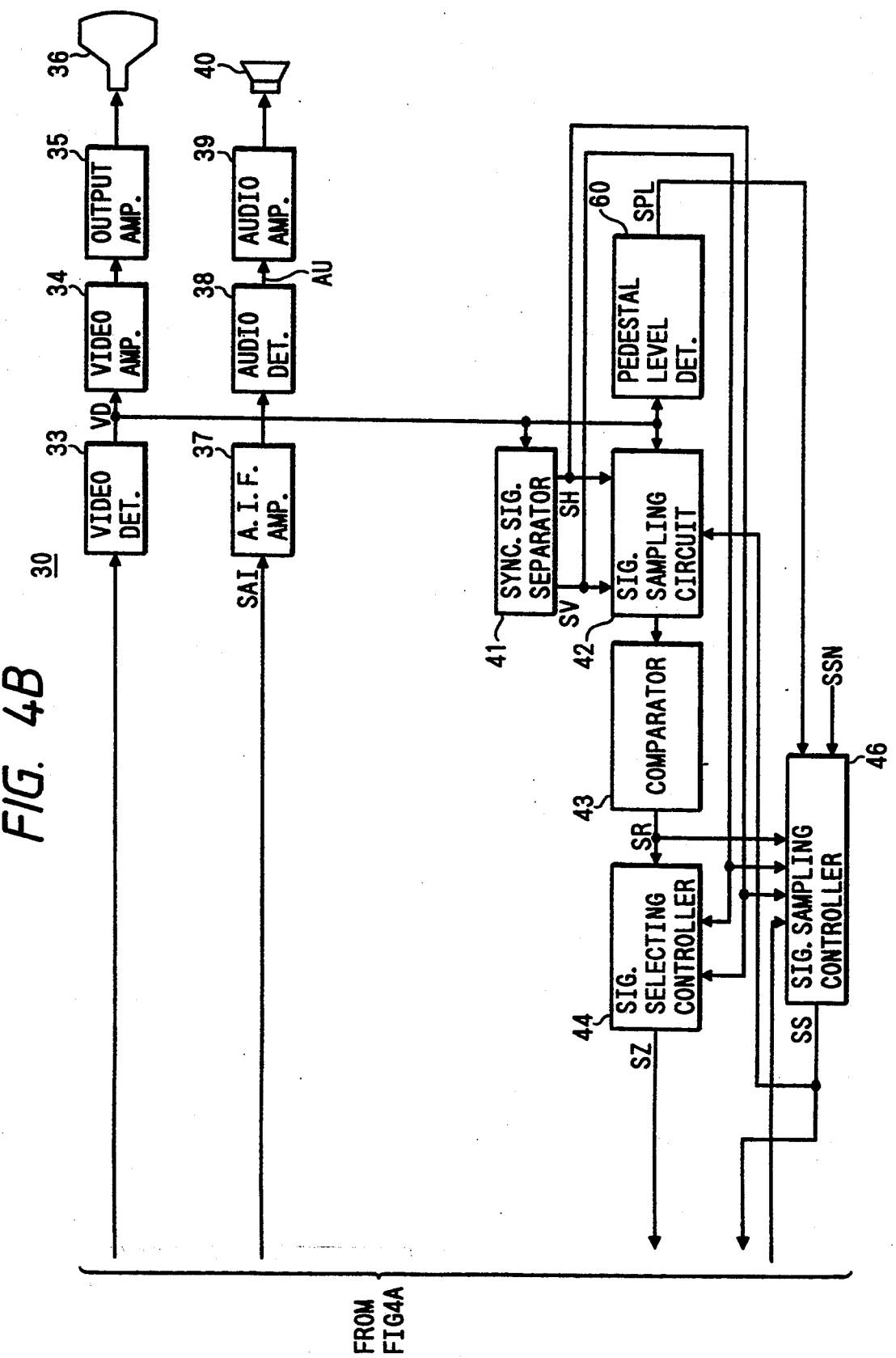

FIGS. 4A and 4B show a second embodiment of space diversity receiver according to the present invention. In FIG. 4, elements and circuit blocks corresponding to those of FIG. 1 are marked with the same references and further description thereof will be omitted.

Referring to FIG. 4, antennas 12A, 12B and 12D are connected with antenna connectors 11A, 11B and 11D, respectively, but an antenna 12C which is to be connected with an antenna connector 11C is not actually connected with the antenna connector 11C, so that the antenna connector 11C constitutes an unoccupied antenna connector.

The antenna connectors 11A to 11D are included in antenna connection detecting portions 13A, 13B, 13C and 13D, respectively. Each of the antenna connection detecting portions 13A to 13D constitutes a connecting jack with the same configuration as shown in FIGS. 5 and 6, in each of which the antenna connection detecting portion 13A is schematically shown as representative of the antenna connection detecting portions 13A to 13D.

Figure 5:
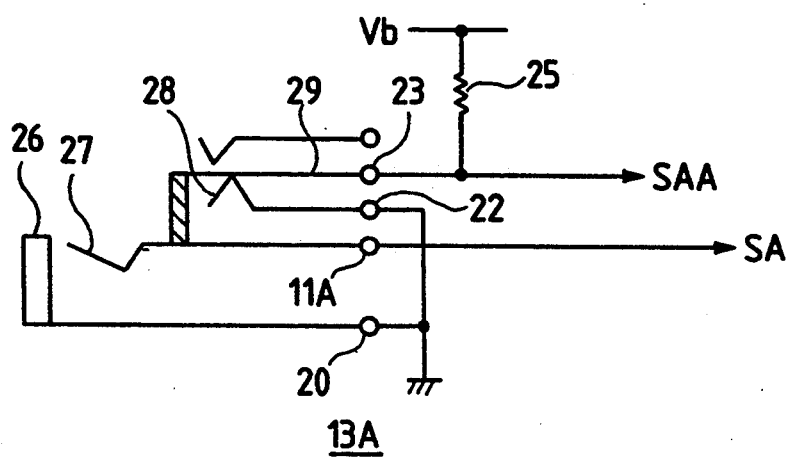
FIGS. 5 and 6 are illustrations used for explaining an antenna connector employed in the embodiment shown in FIG. 4.

In the jack constituted by the antenna connection detecting portion 13A, when the antenna 12A is not connected with the antenna connector 11A, an electrode 26 coupled with a grounded terminal 20 is not connected with an electrode 27 coupled with the antenna connector 11A and an electrode 29 coupled with a detecting terminal 23 and connected through an insulator with the electrode 27 is connected with an electrode 28 coupled with a grounded terminal 22, as shown in FIG. 5. The detecting terminal 23 is connected through a resistor 25 with a voltage source supplying a positive DC voltage Vb. Accordingly, an antenna connector signal SA obtained from the antenna connector 11A has a zero level and an antenna detection output signal SAA obtained from the detecting terminal 23 has a low level corresponding to the ground level.

Figure 6:
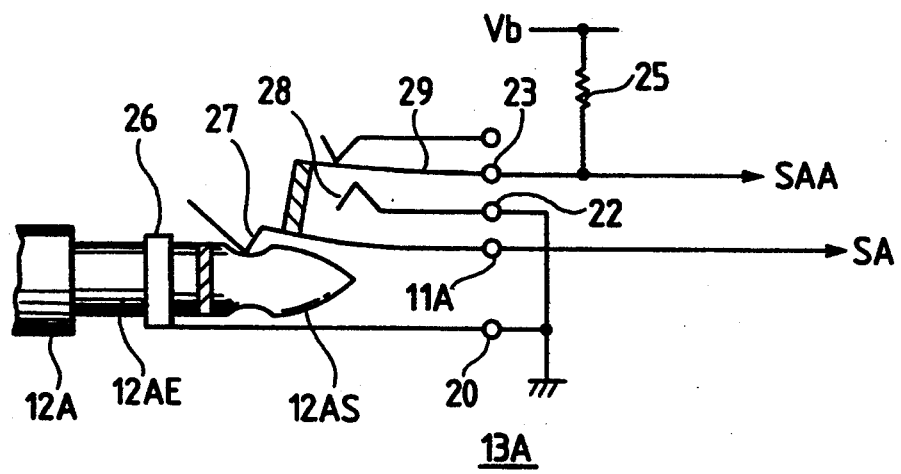

When the antenna 12A is connected with the antenna connector 11A, the electrode 26 coupled with the grounded terminal 20 is connected with a ground electrode 12AE of the antenna 12A and the electrode 27 coupled with the antenna connector 11A is connected with a signal electrode 12AS of the antenna 12A, as shown in FIG. 6. The electrode 27 is moved by the signal electrode 12AS of the antenna 12A and thereby the electrode 29 coupled with the detecting terminal 23 is also moved, together with the electrode 27, so as to be remove from the electrode 28 coupled with the grounded terminal 22. Accordingly, the antenna connector signal SA obtained from the antenna connector 11A constitutes an antenna output signal derived from the antenna 12A and the antenna detection output signal SAA obtained from the detecting terminal 23 has a high level corresponding to the positive DC voltage Vb because the positive DC voltage Vb is supplied through the resistor 25 to the electrode 29 coupled with the detecting electrode 23.

As understood from the above, the antenna connector signal SA obtained from the antenna connector 11A has the zero level and the antenna detection output signal SAA obtained from the detecting terminal 23 has the low level when the antenna 12A is not connected with the antenna connector 11A, and the antenna connector signal SA obtained from the antenna connector 11A constitutes the antenna output signal derived from the antenna 12A and the antenna detection output signal SAA obtained though the antenna connection detecting portion 13A has the high level when the antenna 12A is connected with the antenna connector 11A. In the case of the embodiment shown in FIG. 4, since the antenna 12A is actually connected with the antenna connector 11A, the antenna connector signal SA is the antenna output signal derived from the antenna 12A and the antenna detection output signal SAA obtained through the antenna connection detecting portion 13A has the high level.

In like manner, since the antenna 12B is connected with the antenna connector 11B, an antenna connector signal SB obtained from the antenna connector 11B is an antenna output signal derived from the antenna 12B and an antenna detection output signal SAB obtained through the antenna connection detecting portion 13B has the high level.

In the case of the antenna connector 11C, however, since there is no antenna connected with the antenna connector 11C, an antenna connector signal SC obtained from the antenna connector 11C has the zero level and an antenna detection output signal SAC obtained through the antenna connection detecting portion 13C has the low level.

Further, since the antenna 12D is connected with the antenna connector 11D, an antenna connector signal SD obtained from the antenna connector 11D is an antenna output signal derived from the antenna 12D and an antenna detection output signal SAD obtained through the antenna connection detecting portion 13D has the high level.

The antenna connector signals SA, SB, SC and SD obtained through the antenna connectors 11A to 11D, respectively, when the television broadcast signal is received by each of the antennas 12A, 12B and 12D, are supplied through a capacitor 14A to a switching diode 15A, through a capacitor 14B to a switching diode 15B, through a capacitor 14C to a switching diode 15C and through a capacitor 14D to a switching diode 15D, respectively. The switching diodes 15A, 15B and 15D are controlled as explained later in such a manner that only one of the switching diodes 15A, 15B and 15D is put in the ON state to allow a signal to pass therethrough and the switching diode 15C is continuously put in the OFF state. Therefore one of the antenna connector signals SA, SB and SD is supplied through one of the switching diodes 15A, 15B and 15D and a capacitor 16 to a tuner 31 which constitutes a part of a signal processing circuit block 30.

In the tuner 31, the antenna connector signal SA, SB or SD is amplified and subjected to frequency conversion. Then, a video intermediate frequency signal SVI is obtained based on the antenna connector signal SA, SB or SD from the tuner 31 and supplied to an intermediate frequency amplifier 32. The video intermediate frequency signal SVI amplified by the intermediate frequency amplifier 32 is then supplied to a video detector 33. In the video detector 33, the video intermediate frequency signal SVI is demodulated to produce a video signal VD.

The antenna detection output signals SAA, SAB, SAC and SAD obtained respectively from the antenna connection detecting portions 13A to 13D are supplied to an unoccupied antenna connector detecting portion 45. The unoccupied antenna connector detecting portion 45 is operative to detect, on the strength of the level of each of the antenna detection output signals SAA, SAB, SAC and SAD, one or more of the antenna connectors 11A to 11D, each of which constitutes the unoccupied antenna connector to produce the antenna connector signal SA, SB, SC or SD having the zero level, if any. In the case of the embodiment of FIGS. 4A, 4B, since each of the antenna detection output signals SAA, SAB and SAD has the high level and the antenna detection output signal SAC has the low level, the unoccupied antenna connector detecting portion 45 detects the antenna connector 11C based on the antenna detection output signal SAC and supplies a signal sampling controller 46 with a detection output signal SX which indicates that the antenna connector 11C constitutes the unoccupied antenna connector.

A vertical synchronous signal SV and a horizontal synchronous signal SH derived from a synchronous signal separator 41, a detection output signal SSN derived from a tuner 31, a detection output signal SPL derived from a pedestal level detector 60 and a comparison output signal SR derived from a comparator 43 are also supplied to the signal sampling controller 46. The signal sampling controller 46 supplies both of a diode driving signal generator and a signal sampling circuit 42 with a control signal SS which is produced based on the detection output signals SSN, SPL and SX and the comparison output signal SR during a specific period in a vertical blanking period of a video signal VD detected based on the vertical and horizontal synchronous signals SV and SH, such as a period corresponding to an equalizing pulse period next to the vertical synchronous signal SV.

The diode driving signal generator 47 is operative to supply through three of four output terminals thereof respectively anodes of switching diodes 15A, 15B and 15D with driving signal C1, C2 and C4 successively for every predetermined short period, such as every period of several microseconds, in response to the control signal SS which is produced based the signals including the detection output signal SX indicating that the antenna connector 11C is the unoccupied antenna connector and supplied from the signal sampling controller 46 during the specific period detected by the signal sampling controller 46 and not to supply a switching diode 15C with any driving signal. The switching diodes 15A, 15B and 15D are successively put in the ON state respectively by the driving signals C1, C2 and C4 supplied to the cathodes of the switching diodes 15A, 15B and 15D, and the switching diode 15C is continuously put in the OFF state.

With such an operation of the diode driving signal generator 47, during the specific period detected by the signal sampling controller 46, the switching diodes 15A, 15B and 15D are successively put in the ON state for every predetermined short period so that a signal sampling operation by which the antenna connector signals SA, SB and SD are successively sampled for every predetermined short period to be supplied to a tuner 31 and the switching diode 15C is continuously put in the OFF state so that the antenna connector signal SC is not sampled to be supplied to the tuner 31 is carried out. Accordingly, the switching diodes 15A to 15D and the diode driving signal generator 47 constitute an antenna connector signal selecting portion, and during the specific period, such as the period corresponding to the equalizing pulse period next to the vertical synchronous signal, in every vertical blanking period or every predetermined number of vertical blanking periods of the video signal VD, the video signal VD based on the antenna connector signal SA, video signal VD based on the antenna connector signal SB and video signal VD based on the antenna connector signal SD are successively obtained for every predetermined short period from a video detector 33.

The video signals VD thus obtained based on the antenna connector signals SA, SB and SD, respectively, are supplied to a signal sampling circuit 42 to which and the vertical and horizontal synchronous signals SV and SH derived from the synchronous signal separator 41 and the control signal SS derived from the signal sampling controller 46 are also supplied. The signal sampling circuit 42 is operative to pick out successively each of the video signals VD obtained based on the antenna connector signals SA, SB and SD, respectively, to be supplied the comparator 43 in synchronism with the control signal SS derived from the signal sampling controller 46.

The comparator 43 is operative to hold each of the video signals VD obtained based on the antenna connector signals SA, SB and SD, respectively, and selected successively by the signal sampling circuit 42 and to compare in quality the video signals VD obtained based on the antenna connector signals SA, SB and SD with one another so as to select the best one of the video signals VD obtained based on the antenna connector signals SA, SB and SD, respectively. The comparison output signal SR representing the best video signal VD selected by the comparator 43 is obtained from the comparator 43 to be supplied to a signal selecting controller 44. The signal sampling circuit 42 and the comparator 43 constitute a signal selecting portion for selecting one of the antenna connector signals SA, SB and SD which gives rise to the best one of the video signals VD obtained based on the antenna connector signals SA, SB and SD, respectively, during the specific period detected by the signal sampling controller 46.

The signal selecting controller 44, to which the vertical and horizontal synchronous signals SV and SH derived from the synchronous signal separator 41 are supplied, is operative to supply the diode driving signal generator 47 with a control signal SZ which has different aspects respectively in the case where the comparison output signal SR represents the video signal VD obtained based on the antenna connector signal SA, in the case where the comparison output signal SR represents the video signal VD obtained based on the antenna connector signal SB, and in the case where the comparison output signal SR represents the video signal VD obtained based on the antenna connector signal SD, during a period successive to the specific period in the vertical blanking period of the video signal VD.

The diode driving signal generator 47 does not supply each of the switching diodes 15B to 15D with any driving signal but supplies the switching diode 15A with the driving signal C1 so as to cause only the switching diode 15A to be in the ON state when the control signal SZ from the signal selecting controller 44 corresponds to the comparison output signal SR representing the video signal VD obtained based on the antenna connector signal SA; does not supply each of the switching diodes 15A, 15C and 15D with any driving signal but supplies the switching diode 15B with the driving signal C2 so as to cause only the switching diode 15B to be in the ON state when the control signal SZ from the signal selecting controller 44 corresponds to the comparison output signal SR representing the video signal VD obtained based on the antenna connector signal SB; and does not supply each of the switching diodes 15A to 15C with any driving signal but supplies the switching diode 15D with the driving signal C4 so as to cause only the switching diode 15D to be in the ON state when the control signal SZ from the signal selecting controller 44 corresponds to the comparison output signal SR representing the video signal VD obtained based on the antenna connector signal SD, in the period successive to the specific period in the vertical blanking period of the video signal VD. The change in one of the driving signals C1, C2 and C4 sent out of the diode driving signal generator 47 is carried out at a time point corresponding to the beginning end of the vertical blanking period of the video signal VD.

Accordingly, during the period successive to the specific period in the vertical blanking period of the video signal VD, one of the switching diodes 15A, 15B and 15D is caused to be in the ON state in such a manner as mentioned above so that one of the antenna connector signals SA, SB and SD is supplied to the tuner 31 and thereby the best one of the video signals VD obtained based on the antenna connector signals SA, SB and SD, respectively, is derived from the video detector 33.

As described above, since the antenna connector signals SA, SB and SD obtained respectively from the antenna connectors 11A, 11B and 11D with which the antennas 12A, 12B and 12D are connected are subjected to the signal sampling operation in the antenna connector signal selecting portion which comprises the switching diodes 15A to 15D and the diode driving signal generator 47 and the antenna connector signal SC obtained from the antenna connector 11C with which any antenna is not connected is not subjected to the signal sampling operation, the antenna connector signal SC is prevented from being supplied to the tuner 31 so that the video signal VD derived from the video detector 33 is prevented from including a lacking portion resulted from the antenna connector signal SC during the specific period. Accordingly, harsh noise resulting from the signal sampling operation to be contained in a reproduced sound which is obtained from a speaker 40 in accordance with an audio signal AU is effectively suppressed.

Figure 7:
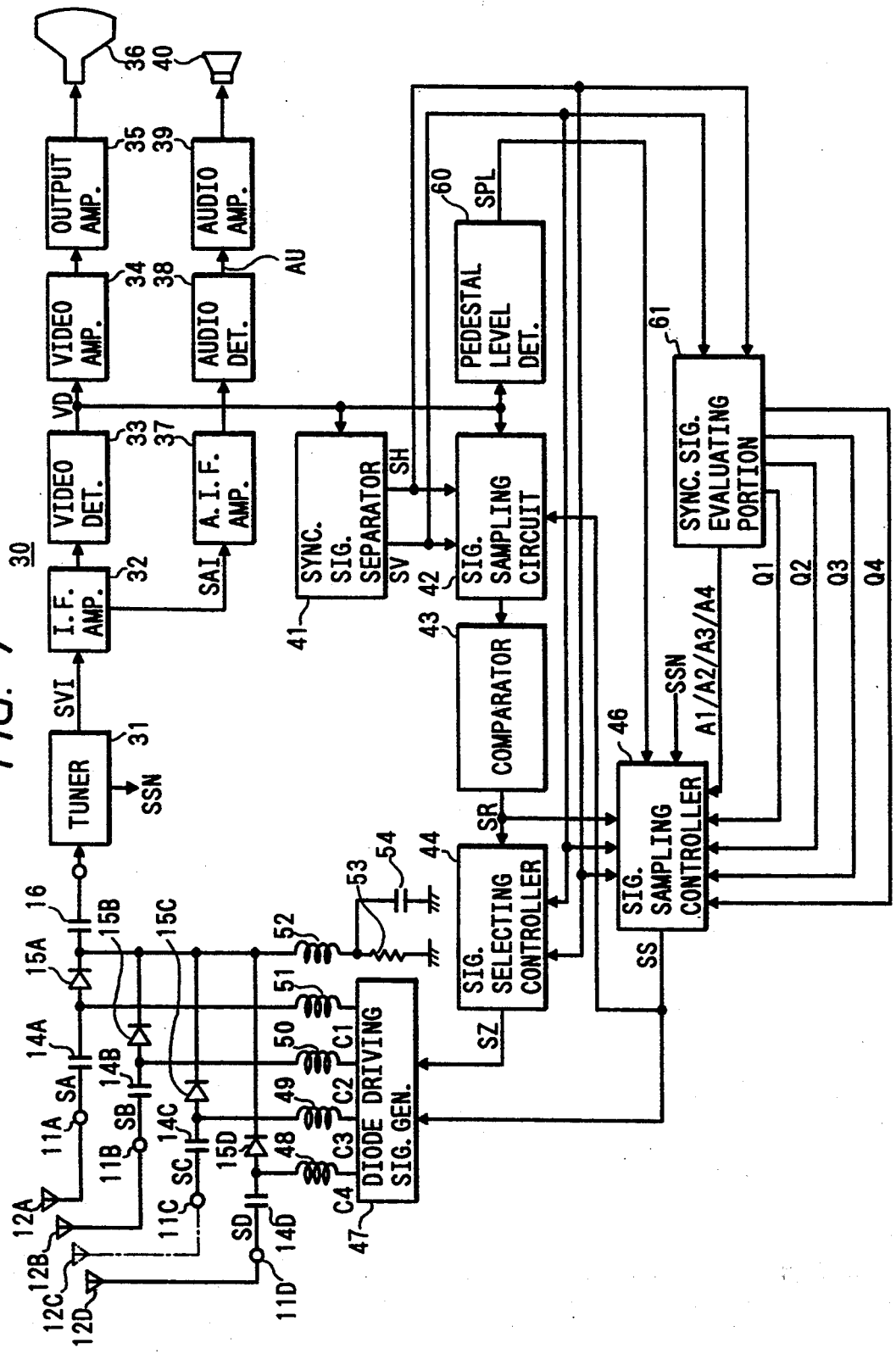
FIG. 7 is a schematic circuit diagram containing block expression and showing a third embodiment of space diversity receiver according to the present invention.

FIG. 7 shows a third embodiment of space diversity receiver according to the present invention. In FIG. 7, elements and circuit blocks corresponding to those of FIGS. 4A and 4B are marked with the same references and further description thereof will be omitted.

Referring to FIG. 7, antennas 12A, 12B and 12D are connected with antenna connectors 11A, 11B and 11D, respectively, but an antenna 12C which is to be connected with an antenna connector 11C is not connected actually with the antenna connector 11C, so that the antenna connector 11C constitutes a vacant antenna connector.

A vertical synchronous signal SV and a horizontal synchronous signal SH derived from a synchronous signal separator 41 are supplied to a synchronous signal evaluating portion 61, in addition to a signal sampling circuit 42, a signal selecting controller 44 and a signal sampling controller 46. The synchronous signal evaluating portion 61 is operative to supply the signal sampling controller 46 with antenna connector selecting signals A1, A2, A3 and A4 selectively and thereby to control the signal sampling controller 46 so as to supply a diode driving signal generator 47 with such a control signal SS as to cause the diode driving signal generator 47 to supply a switching diode 15A with a driving signal C1 in response to the antenna connector selecting signal A1, to supply a switching diode 15B with a driving signal C2 in response to the antenna connector selecting signal A2, to supply a switching diode 15C with a driving signal C3 in response to the antenna connector selecting signal A3, and to supply a switching diode 15D with a driving signal C4 in response to the antenna connector selecting signal A4.

With the operation of the synchronous signal evaluating portion 61 thus performed, the switching diode 15A is put in the ON state to allow the antenna connector signal. SA obtained from the antenna connector 11A to be supplied through the switching diode 15A to a tuner 31 so that a video signal VD based on the antenna connector signal SA is obtained from a video detector 33 and thereby vertical and horizontal synchronous signals SV and SH in the video signal VD obtained based on the antenna connector signal SA are derived from the synchronous signal separator 41 when the antenna connector selecting signal A1 is supplied to the signal sampling controller 46 from the synchronous signal evaluating portion 61.

In like manner, the switching diode 15B is put in the ON state to allow the antenna connector signal SB obtained from the antenna connector 11B to be supplied through the switching diode 15B to the tuner 31 so that the video signal VD based on the antenna connector signal SB is obtained from the video detector 33 and thereby vertical and horizontal synchronous signals SV and SH in the video signal VD obtained based on the antenna connector signal SB are derived from the synchronous signal separator 41 when the antenna connector selecting signal A2 is supplied to the signal sampling controller 46 from the synchronous signal evaluating portion 61. The switching diode 15C is put in the ON state to allow the antenna connector signal SC obtained from the antenna connector 11C to be supplied through the switching diode 15C to the tuner 31 so that the video signal VD based on the antenna connector signal SC is obtained from the video detector 33 and thereby vertical and horizontal synchronous signals SV and SH in the video signal VD obtained based on the antenna connector signal SC are derived from the synchronous signal separator 41 when the antenna connector selecting signal A3 is supplied to the signal sampling controller 46 from the synchronous signal evaluating portion 61. Further, the switching diode 15D is put in the ON state to allow the antenna connector signal SD obtained from the antenna connector 11D to be supplied through the switching diode 15D to the tuner 31 so that the video signal VD based on the antenna connector signal SD is obtained from the video detector 33 and thereby vertical and horizontal synchronous signals SV and SH in the video signal VD obtained based on the antenna connector signal SD are derived from the synchronous signal separator 41 when the antenna connector selecting signal A4 is supplied to the signal sampling controller 46 from the synchronous signal evaluating portion 61.

Under such a condition, the synchronous signal evaluating portion 61 evaluates the vertical and horizontal synchronous signals SV and SH separated, from the video signal VD obtained based on the antenna connector signal SA, the vertical and horizontal synchronous signals SV and SH separated from the video signal VD obtained based on the antenna connector signal SB, the vertical and horizontal synchronous signals SV and SH separated from the video signal VD obtained based on the antenna connector signal SC, and the vertical and horizontal synchronous signals SV and SH separated from the video signal VD obtained based on the antenna connector signal SD. Then, the synchronous signal evaluating portion 61 produces a control signal Q1 having a high level for indicating that an antenna 12A is connected with the antenna connector 11A when the vertical and horizontal synchronous signals SV and SH separated from the video signal VD obtained based on the antenna connector signal SA are supplied from the synchronous signal separator 41 in an appropriate manner and a control signal Q1 having a low level for indicating that the antenna connector 11A constitutes an unoccupied antenna connector when the vertical and horizontal synchronous signals SV and SH separated from the video signal VD obtained based on the antenna connector signal SA are supplied from the synchronous signal separator 41 in an inappropriate manner.

In like manner, the synchronous signal evaluating portion 61 produces a control signal Q2 having a high level for indicating that an antenna 12B is connected with the antenna connector 11B when the vertical and horizontal synchronous signals SV and SH separated from the video signal VD obtained based on the antenna connector signal SB are supplied from the synchronous signal separator 41 in an appropriate manner and a control signal Q2 having a low level for indicating that the antenna connector 11B constitutes an unoccupied antenna connector when the vertical and horizontal synchronous signals SV and SH separated from the video signal VD obtained based on the antenna connector signal SB are supplied from the synchronous signal separator 41 in an inappropriate manner. The synchronous signal evaluating portion 61 produces a control signal Q3 having a high level for indicating that an antenna 12C is connected with the antenna connector 11C when the vertical and horizontal synchronous signals SV and SH separated from the video signal VD obtained based on the antenna connector signal SC are supplied from the synchronous signal separator 41 in an appropriate manner and a control signal Q3 having a low level for indicating that the antenna connector 11C constitutes an unoccupied antenna connector when the vertical and horizontal synchronous signals SV and SH separated from the video signal VD obtained based on the antenna connector signal SC are supplied from the synchronous signal separator 41 in an inappropriate manner. Further, the synchronous signal evaluating portion 61 produces a control signal Q4 having a high level for indicating that an antenna 12D is connected with the antenna connector 11D when the vertical and horizontal synchronous signals SV and SH separated from the video signal VD obtained based on the antenna connector signal SD are supplied from the synchronous signal separator 41 in an appropriate manner and a control signal Q4 having a low level for indicating that the antenna connector 11D constitutes an unoccupied antenna connector when the vertical and horizontal synchronous signals SV and SH separated from the video signal VD obtained based on the antenna connector signal SD are supplied from the synchronous signal separator 41 in an inappropriate manner. The control signals Q1, Q2, Q3 and Q4 thus produced are supplied to the signal sampling controller 46.

In such a manner as described above, one or more of the antenna connectors 11A, 11B, 11C and 11D, each of which constitutes the unoccupied antenna connector, are detected by the synchronous signal evaluating portion 61, if any, and one or more of the control signals Q1, Q2, Q3 and Q4, each of which corresponds to the unoccupied antenna connector, are supplied to the signal sampling controller 46 with the low level from the synchronous signal evaluating portion 61. In the case of the embodiment of FIG. 7, since the antenna connector 11C constitutes the unoccupied antenna connector, the control signals Q1, Q2 and Q4 each having the high level and the control signal Q3 having the low level for indicating that the antenna connector 11A constitutes the unoccupied antenna connector are supplied to the signal sampling controller 46 from the synchronous signal evaluating portion 61.

A vertical synchronous signal SV and a horizontal synchronous signal SH derived from a synchronous signal separator 41, a detection output signal SSN derived from a tuner 31, a detection output signal SPL derived from a pedestal level detector 60 and a comparison output signal SR derived from a comparator 43 are also supplied to the signal sampling controller 46. The signal sampling controller 46 supplies both of a diode driving signal generator 47 and a signal sampling circuit 42 with a control signal SS which is produced based on the detection output signals SSN and SPL, the comparison output signal SR, the control signals Q1, Q2 and Q4 each having the high level and the control signal Q3 having the low level during a specific period in a vertical blanking period of a video signal VD detected based on the vertical and horizontal synchronous signals SV and SH, such as a period corresponding to an equalizing pulse period next to the vertical synchronous signal SV.

The diode driving signal generator 47 is operative to supply through three of four output terminals thereof respectively anodes of switching diodes 15A, 15B and 15D with driving signals C1, C2 and C4 successively for every predetermined short period, such as every period of several microseconds, in response to the control signal SS which is produced based the signals including the control signals Q1, Q2 and Q4 each having the high level and the control signal Q3 having the low level for indicating that the antenna connector 11C is the unoccupied antenna connector and supplied from the signal sampling controller 46 during the specific period detected by the signal sampling controller 46 and not to supply a switching diode 15C with any driving signal. The switching diodes 15A, 15B and 15D are successively put in the ON state respectively by the driving signals C1, C2 and C4 supplied to the cathodes of the switching diodes 15A, 15B and 15D, and the switching diode 15C is continuously put in the OFF state.

With such an operation of the diode driving signal generator 47, during the specific period detected by the signal sampling controller 46, the switching diodes 15A, 15B and 15D are successively put in the ON state for every predetermined short period so that a signal sampling operation by which the antenna connector signals SA, SB and SD are successively sampled for every predetermined short period to be supplied to the tuner 31 and the switching diode 15C is continuously put in the OFF state so that the antenna connector signal SC is not sampled to be supplied to the tuner 31 is carried out. Accordingly, the switching diodes 15A to 15D and the diode driving signal generator 47 constitute an antenna connector signal selecting portion, and during the specific period, such as the period corresponding to the equalizing pulse period next to the vertical synchronous signal SV, in every vertical blanking period or every predetermined number of vertical blanking periods of the video signal VD, the video signal VD based on the antenna connector signal SA, video signal based on the antenna connector signal SB and video signal VD based on the antenna connector signal SD are successively obtained for every predetermined short period from the video detector 33.

The video signals VD thus obtained based on the antenna connector signals SA, SB and SD, respectively, are supplied to a signal sampling circuit 42 to which the vertical and horizontal synchronous signals SV and SH derived from the synchronous signal separator 41 and the control signal SS derived from the signal sampling controller 46 are also supplied. The signal sampling circuit 42 is operative to pick out successively each of the video signals VD obtained based on the antenna connector signals SA, SB and SD, respectively, to be supplied the comparator 43 in synchronism with the control signal SS derived from the signal sampling controller 46.

Then, the signal selection for selecting one of the antenna connector signals SA, SB and SD which gives rise to the best one of the video signals VD obtained based on the antenna connector signals SA, SB and SD, respectively, is carried out by a signal selecting portion comprising the signal sampling circuit 42 and the comparator 43 in the same manner as that in the embodiment shown in FIG. 4.

Accordingly, during a period successive to the specific period in the vertical blanking period of the video signal VD, one of the switching diodes 15A, 15B and 15D is caused to be in the ON state so that one of the antenna connector signals SA, SB and SD is supplied to the tuner 31 and thereby the best one of the video signals VD obtained based on the antenna connector signals SA, SB and SD, respectively, is derived from the video detector 33.

As described above, in the embodiment of FIG. 7 also, since the antenna connector signals SA, SB and SD obtained respectively from the antenna connectors 11A, 11B and 11D with which the antennas 12A, 12B and 12D are connected are subjected to the signal sampling operation in the antenna connector signal selecting portion which comprises the switching diodes 15A to 15D and the diode driving signal generator 47 and the antenna connector signal SC obtained from the antenna connector 11C which is unconnected to an antenna is not subjected to the signal sampling operation, an antenna connector signal SC is prevented from being supplied to the tuner 31 from the antenna connector 11C so that the video signal VD derived from the video detector 33 is prevented from including a lacking portion resulting from the antenna connector signal SC during the specific period. Accordingly, harsh noise resulting from the signal sampling operation to be contained in a reproduced sound which is obtained from a speaker 40 in accordance with an audio signal AU is effectively suppressed.

Figure 8B:
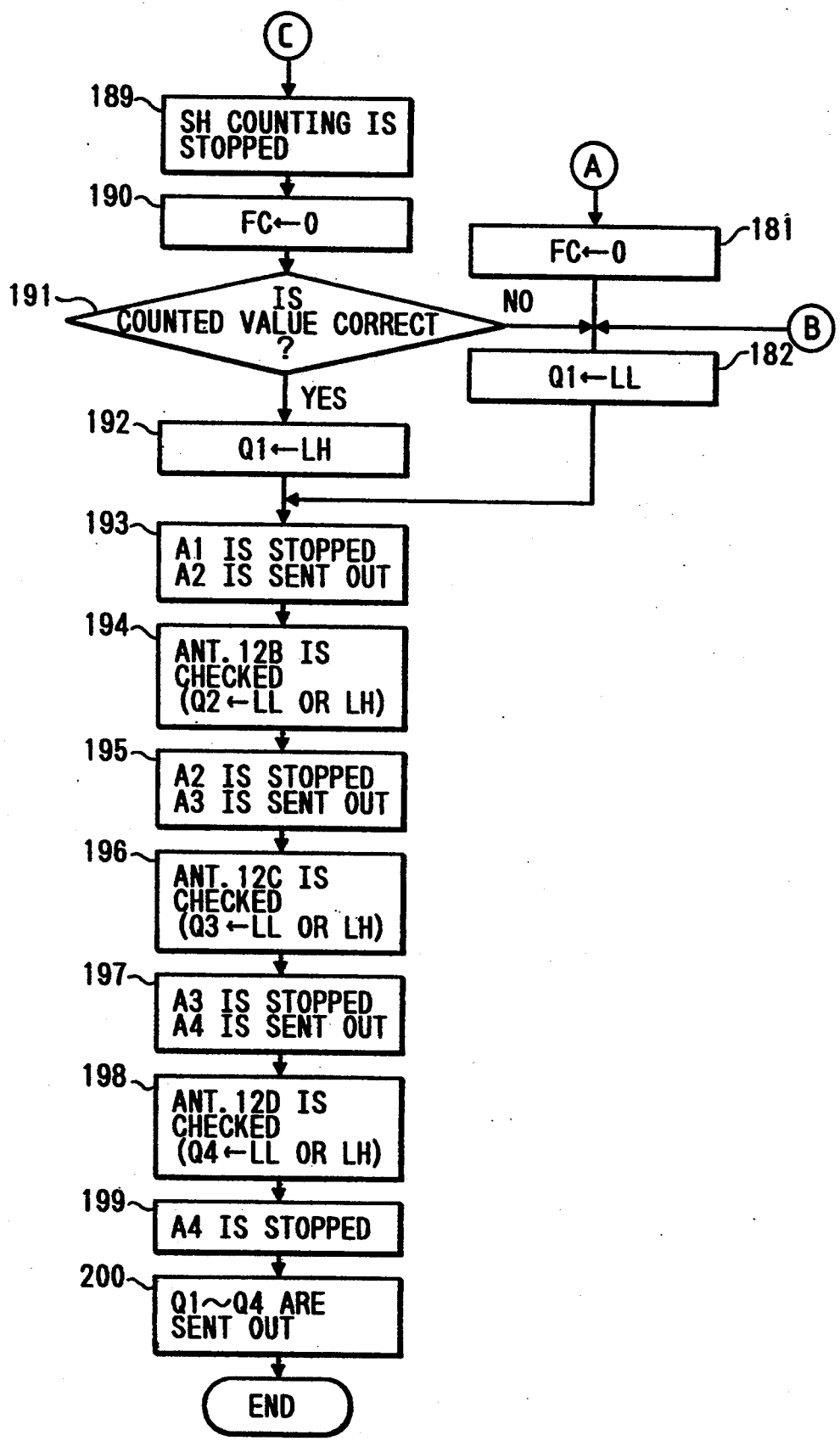

The synchronous signal evaluating portion 61 employed in the embodiment shown in FIG. 7 to operate as aforementioned is composed of, for example, a microcomputer and examples of control programs carried out by such a microcomputer for controlling the signal sampling operation in the antenna connector signal selecting portion are shown by a flow chart of FIGS. 8A and 8B.

Referring to the flow chart shown in FIG. 8, in step 171, the antenna connector selecting signal A1 is sent out to the signal sampling controller 46, and in step 172, it is checked whether the vertical synchronous signal SV arrives from the synchronous signal separator 41. When the vertical synchronous signal SV does not arrive, it is checked whether a timer flag FT is "1" or not, in step 173. If the timer flag FT is not "1", a timer is started operating in step 174 and the timer flag FT is set to be "1" in step 175, and then the process advances to step 176. If it is clarified in the step 173 that the timer flag FT is "1", the timer process advances to the step 176 directly from the step 173.

In step 176, it is checked whether a time Tt measured by the timer is longer than or equal to a predetermined period Ta or not. If the time Tt is smaller than the predetermined period Ta, the process returns to the step 172. If the time Tt is longer than or equal to the predetermined period Ta, the timer is stopped operating in step 177 and the timer flag FT is set to be "0" is step 178, and then the process advances to step 179. In the step 179, it is checked whether a counter flag FC is "1" or not. When the counter flag FC is "1", a counter for counting the horizontal synchronous signals SH is stopped operation is step 180 and the counter flag FC is set to be "0" is step 181, and then the process advances to step 182. If it is clarified in the step 179 that the counter flag FC is "0", the process advances to the step 182 directly from the step 179. In the step 182, the control signal Q1 is formed to have a low level LL and stored in a memory device, and the process advances to step 193.

When it is clarified in the step 172 that the vertical synchronous signal SV arrives from the synchronous signal separator 41, it is checked whether the timer flag FT is "0" or not, in step 183. If the timer flag FT is not "0", the timer is stopped operating in step 184 and the timer flag FT is set to be "0" in step 185, and then the process advances to step 186. If it is clarified in the step 183 that the timer flag FT is "0", the process advances to the step 186 directly from the step 183.

In the step 186, it is checked whether the counter flag FC is "1" or not. If the counter flag FC is "0", the counter is started to count the horizontal synchronous signals SH arriving from the synchronous signal separator 41 in step 187 and the counter flag FC is set to be "1" in step 188, and then the process returns to the step 172. If it is clarified in the step 186 that the counter flag FC is "1", the counter is stopped counting the horizontal synchronous signals SH in step 189 and the counter flag FC is set to be "0" in step 190, and then the process advances to the step 191.

In the step 191, it is checked whether a counted value of the horizontal synchronous signals SH obtained from the counter is appropriate or not. If the counted value is not appropriate, the process returns the step 182. If the counted value is appropriate, the control signal Q1 is formed to have a high level LH and stored in the memory device in step 192 and the process advances to step 193.

With the processes described above, the check of the antenna 12A in which it is checked whether the antenna 12A is connected with the antenna connector 11A or not has finished.

In the step 193, the antenna connector selecting signal A1 is stopped being sent out and instead the antenna connector selecting signal A2 is sent out to the signal sampling controller 46. Then, in step 194, the check of the antenna 12B in which it is checked whether the antenna 12B is connected with the antenna connector 11B or not is carried out in the same manner as the check of the antenna 12A and the control signal Q2 is formed to have the low level LL or high level LH and stored in the memory device. After the check of the antenna 12B has finished, the process advances to step 195.

In the step 195, the antenna connector selecting signal A2 is stopped being sent out and instead the antenna connector selecting signal A3 is sent out to the signal sampling controller 46. Then, in step 196, the check of the antenna 12C in which it is checked whether the antenna 12C is connected with the antenna connector 11C or not is carried out in the same manner as the check of the antenna 12A and the control signal Q3 is formed to have the low level LL or the high level LH and stored in the memory device. After the check of the antenna 12C has finished, the process advances to step 197.

In the step 197, the antenna connector selecting signal A3 is stopped being sent out and instead the antenna connector selecting signal A4 is sent out to the signal sampling controller 46. Then, in step 198, the check of the antenna 12D in which it is checked whether the antenna 12D is connected with the antenna connector 11D or not is carried out in the same manner as the check of the antenna 12A and the control signal Q4 is formed to have the low level LL or high level LH and stored in the memory device. After the check of the antenna 12D has finished, the process advances to step 199.

In the step 199, the antenna connector selecting signal A4 is stopped being sent out. Then, each of the control signals Q1, Q2, Q3 and Q4 is set to be continuously sent out to the signal sampling controller 46, in step 200, and then the control program is completed.

What is claimed is:

1. A space diversity receiver for receiving broadcast signals comprising:
   a plurality of antenna connectors, each of which is to be connected to an antenna,
   signal selecting means connected to the antenna connectors for selecting a signal from among separate signals obtained from each of the antenna connectors,
   signal processing circuit means supplied with each signal from the antenna connectors selected by the signal selecting means and operative to produce an output signal based on each signal selected by the signal selecting means, timing signals, and at least one detection output signal indicative of a selected characteristic of each signal selected by the signal selecting means,
   signal sampling control means supplied with the timing signals and the one detection output signal and operative to cause the signal selecting means to perform a signal sampling operation through which the signals obtained respectively from the antenna connectors are selectively sampled during a predetermined specific period of recurring, predetermined short periods and supplied to the signal processing circuit means,
   antenna connector selecting means connected to the signal processing circuit means and supplied with the output signal for comparing with one another in quality output signals of the signal processing circuit means successively obtained based on signals sampled through the signal sampling operation performed by the signal selecting means and generating a comparison output signal indicative of one of the antenna connectors through which a signal giving rise to the best output signal of the signal processing circuit means is introduced during said predetermined specific period, and
   signal selecting control means connected to control the signal selecting means and supplied with the comparison output signal from the antenna connector selecting means for causing the signal selecting means to select the signal introduced through the antenna connector selected by the antenna connector selecting means during a period successive to said predetermined specific period,
   wherein the signal sampling control means is further operative to elongate an interval between said predetermined specific periods so that a frequency of signal sampling operations in the signal selecting means is reduced in response to an increase in stability of the signal selected to be supplied to the signal processing circuit means during said period successive to said predetermined specific period and to stop the signal sampling operation when the signal selected to be supplied to the signal processing circuit block during said period successive to said predetermined specific period is sufficiently stabilized.

2. A space diversity receiver according to claim 1, wherein said signal selecting means comprises a plurality of switching devices having respective first ends connected with the antenna connectors, respectively, and respective second ends connected in common to the signal processing circuit means and a driving signal generator for supplying each of said switching devices selectively with a driving signal.

3. A space diversity receiver according to claim 2, wherein each switching device comprises a diode having one end connected through a first capacitor with one of the antenna connectors and the other end connected through a second capacitor with the signal processing circuit means.

4. A space diversity receiver according to claim 1, wherein said antenna connector selecting means comprises a signal sampling circuit for sampling each of the output signals of the signal processing circuit means obtained based on the signals sampled through said signal sampling operation in the signal selecting means, respectively, and a comparator for comparing in quality the output signals of the signal processing circuit means sampled by said signal sampling circuit with one another to supply the signal selecting control means with the comparison output signal indicating said selected antenna connector through which the signal giving rise to the best output signal of the signal processing circuit means is introduced.

5. A space diversity receiver according to claim 1, wherein the signal sampling control means receives from the signal processing circuit means as the one detecting output signal a signal to noise ratio signal.

6. A space diversity receiver according to claim 5, wherein one of the signals output by the signal processing circuit means is a video signal and the signal sampling control means receives from the signal processing circuit means as a second detecting output signal a signal indicative of a pedestal level of the video signal.

7. A space diversity receiver according to claim 1, wherein the broadcast signals are television signals and the predetermined short periods are selected to occur during one or more vertical blanking intervals of the television signals as determined by the signal sampling control means.

8. A space diversity receiver according to claim 1, wherein the signal sampling control means determines the frequency of the sampling operation by comparing a predetermined range of numbers to the difference between a number of times in the predetermined specific period a signal of one of the antenna connectors is selected as a best signal most frequently and a number of times in the predetermined specific period a signal of another one of the antenna connectors is selected second most frequently as a best signal and increases the sampling frequency when the difference exceeds the predetermined range of numbers.

* * * * *